(12) United States Patent
Rüdén

(10) Patent No.: US 8,746,359 B2
(45) Date of Patent: Jun. 10, 2014

(54) EXPLOSION SUPPRESSOR

(76) Inventor: Roger Rüdén, Stockholm (SE)

( * ) Notice: Subject to any disclaimer, the term of this patent is extended or adjusted under 35 U.S.C. 154(b) by 869 days.

(21) Appl. No.: 12/310,249

(22) PCT Filed: Aug. 24, 2006

(86) PCT No.: PCT/SE2006/000978
§ 371 (c)(1),
(2), (4) Date: Feb. 23, 2009

(87) PCT Pub. No.: WO2008/024040
PCT Pub. Date: Feb. 28, 2008

(65) Prior Publication Data
US 2010/0236798 A1  Sep. 23, 2010

(51) Int. Cl.
*A62C 3/00* (2006.01)
(52) U.S. Cl.
USPC ............. 169/66; 220/88.1; 220/563; 220/734
(58) Field of Classification Search
USPC ............. 169/66; 220/88.1, 88.2, 560.01, 563, 220/734
See application file for complete search history.

(56) References Cited

U.S. PATENT DOCUMENTS

| | | | | |
|---|---|---|---|---|
| 927,499 A * | 7/1909 | Davis | ............... | 434/214 |
| 3,400,854 A * | 9/1968 | Conaway et al. | ............. | 220/734 |
| 4,006,908 A * | 2/1977 | Minami | ............. | 473/200 |
| 4,013,190 A | 3/1977 | Wiggins et al. | | |
| 4,597,451 A | 7/1986 | Moore et al. | | |
| 4,613,054 A | 9/1986 | Schrenk | | |
| 4,927,045 A | 5/1990 | Lichka | | |
| 5,000,336 A | 3/1991 | Gass | | |
| 6,062,417 A * | 5/2000 | Evans | ............. | 220/563 |
| 2007/0281803 A1 * | 12/2007 | Jeong | ............. | 473/371 |

* cited by examiner

*Primary Examiner* — Jason Boeckmann
(74) *Attorney, Agent, or Firm* — Dilworth & Barrese, LLP

(57) ABSTRACT

The invention relates to an element (7) intended to decrease the risk of explosion when handling fuel inside a container (1). The element is adapted to be positioned inside the container and is arranged to suppress a possible combustion of the fuel inside the container. The invention also relates to a use of such an element inside a container to decrease the risk for explosion when handling fuel.

19 Claims, 4 Drawing Sheets

EXPLOSION SUPPRESSOR

TECHNICAL FIELD

Figure 1A:
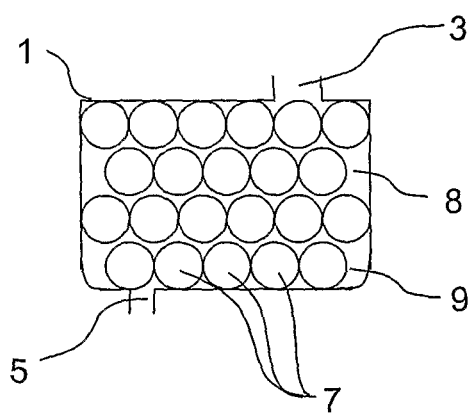

The present invention relates to an element intended to decrease the risk of explosion when handling fuel in a container. The element is designed to be positioned inside the container and is arranged to suppress a combustion of the fuel inside the container.

PRIOR ART

When storing fuel in a container there is usually some amounts of air inside the container. The air may for example enter the container when the container is emptied on fuel. The fuel may then react with the oxygen in the air wherein an explosive process may occur if the fuel is ignited, since the reaction rate of the combustion increases with an increasing temperature. Explosive fuels may for example comprise a gas, a liquid substance such as gasoline, or a solid substance. Examples of containers are cisterns, tanks, vessels, containers, and fuel conductors etc. In the example of gasoline the risk of explosion is greatest when the gasoline tank is filled with one third of gasoline and with two thirds of air.

It is known to decrease the risk of explosion in gasoline tanks by positioning an element comprising tangled, thin, flexible threads, or bands, of metal inside the container. The element absorbs heat and conducts the heat away from a possible combustion zone, decreasing the reaction rate. Furthermore the element decreases fluid movements inside the fuel and in the air above the fuel, which also decreases the reaction rate of a possible combustion. Since the element consists of a tangle of thin, flexible threads and bands the element fills a large volume inside the container in comparison with the decrease in fuel storage capacity for the tank when the element is placed inside the tank.

One problem with this element is that it is difficult to place the element inside the tank in such a way that the element is evenly distributed throughout the entire volume of the tank. The element must therefore be placed inside the container during the manufacturing of the container and with great care. Otherwise there may be unfilled gaps inside the container, in which the risk of explosion remains. Furthermore there is a risk that the element shrinks or collapses after some time, either due to its own weight or due to repeated exposure to fuel flows, after which the element no longer fills the entire volume of the tank, so that the risk of explosion remains or is increased.

In document U.S. Pat. No. 5,000,346, U.S. Pat. No. 4,613,054, and EP 0 256 239 several examples of elements adapted to fill the volume of a fuel container is shown. The elements comprise a metal net folded in different ways so that the elements form a body filled with several layers of the metal net. These elements also decrease the risk of explosion when placed inside the container. Since the elements are separate bodies it is easier to fill the container with the elements, even after the manufacturing of the container. However, one problem with these elements is that the elements comprise a lot of material, which fills the space in the tank that could be used for storage of fuel. Furthermore the material of these elements may also shrink or collapse due to their own weight or due to fluid movements after prolonged use, wherein unfilled gaps may be formed inside the container. Therefore a sufficient amount of material must be placed inside the container so that the material fills the entire container. Furthermore, some of the elements shown are difficult to arrange inside a tank in a simple manner.

SUMMARY OF THE INVENTION

One aspect of the present invention concerns an element for decreasing the risk of explosion when handling a fuel inside a container, and which allows an improved distribution of heat conducting material inside a fuel tank.

Another aspect concerns an element decreasing the risk of explosion when handling a fuel inside a container, which simplifies the positioning of the element inside the container.

Another aspect of the invention concerns a use of an element inside a container, which element is designed to decrease the risk of explosion inside the container and which improves the safety.

These and other aspects are achieved with an element and use of an element according to the description herein. Such an element comprises an outer wall portion enclosing an inner space, and an inner wall portion extending inside the inner space and supporting the outer wall portion with at least one end part of the inner wall portion. Hence the element becomes shape permanent due to the support from the inner wall. This decreases the risk that the element will shrink or collapse during use and thus the risk that the volume in which the element acts as an explosion suppressor will decrease. Hence an improved safety during the use of the element is achieved.

Preferably the inner wall is arranged to support the outer wall so that a force applied onto the outer wall will be transferred to, and act on, the end part of the inner wall. Preferably the inner wall is angled substantially perpendicular relative to the outer wall, wherein the inner wall will experience a compressive force. Since materials have a better resistance towards compressive forces than against, for example, a bending force, the inner space need not be filled with as many layers of inner walls or as thick inner walls in order to support the outer wall portion in a satisfying way. Thus such an element may comprise a smaller amount of material without decreasing the shape permanency capacity of the element.

Furthermore it is easier and quicker to place the element inside the container since no work is needed to change the shape of the element so that the element fills the entire container. Furthermore the manufacturing of such a element may be standardized wherein it is easier and thus less costly to produce such a stiff, shape permanent element.

The element comprises at least one wall portion which is in contact with the fuel and which may lead heat from a possible combustion. Thus the element suppress the combustion of the fuel. Preferably the element is made in a substantially stiff material, wherein the wall portion may be thin and the element may be designed with such a shape that the relationship between the surface area of the element and the volume of the element is very large. Hence, less material is needed to manufacture the element, which increases the storage capacity of the container.

With the expression "shape permanency" is intended that the shape of the elements is retained when the element is subjected to normal pressures or forces inside the container, such as pressures or forces from the fuel and from other elements inside the container. With shape permanency is not intended that the element with necessity is shape permanent when subjected to extreme loads and forces. The element may also be designed with such a shape that the element as a whole is shape permanent even if a single wall portion is as thin that it would be possible to change the shape of the wall portion when the wall portion is not incorporated inside the element.

Said inner wall extends through the inner space. Hence it is ensured that the distance from an arbitrary point for the fuel inside the hollow space of the element to a wall portion, either the inner wall or the outer wall constituting the outer surface of the element, is small. Hence the function of the element as an explosion suppressor is increased.

In one embodiment the inner wall portion extend across the inner space, so that the inner wall portion support the outer wall in at least two locations with one end part of the inner wall portion. Preferably the inner wall portion extends substantially straight through the inner space, wherein said two support locations of the outer wall are positioned substantially opposite to each other. Hence the inner wall will prevent an applied compressive force from compressing the element. In one embodiment the inner wall portion comprises a first portion arranged to support the outer wall portion with one end of the first portion, and a second portion arranged at an angle with the first portion, and arranged to support the outer wall portion with one end of the second wall portion. Hence the inner wall may support the outer wall in several directions.

Preferably said inner wall comprises at least two separate wall portions, which are held together by the outer wall. This is a cost efficient method for holding together an inner wall with a complex shape made from more than one parts.

According to one embodiment the shape of the element is adapted for placement of the element inside the container together with several other similar elements. Thus elements with standard size may be used in containers with different sizes, by varying the number of elements inside the container. Preferably the element is designed so that a hollow space is obtained between the elements when several similar elements are placed inside the container. Hence fuel may be stored and received in said hollow space outside the elements. Thus the volume in which the element acts as an explosive suppressor is larger than the outer contour of the element. Preferably the element is adapted to the container in such a way that the element is designed with a size smaller than an opening into the container. Preferably the element is smaller than an inlet opening intended for filling fuel into the container, alternatively smaller than an opening for cleaning, or for other purposes of the container. Hence, it is possible to place the element inside the container after that the manufacturing of the container is finished and the container is sealed.

According to one embodiment the element is designed with an outer surface adapted to bear against the outer surfaces of the other similar elements in a supportive way. Thus the elements may be positioned in a vertical direction onto each other, as well in a lateral direction side by side with each other, wherein the elements may be used in containers of different shapes. With advantage the outer surface of the element is adapted so that the element bear against the outer surfaces of other similar elements in a loose and/or unattached manner. Thus an element may be moved inside the container on, or around, the other elements, wherein several elements may easily be distributed inside an already sealed container. The elements may for example be moved and distributed inside the container by someone moving them with a stick. In one embodiment the elements may be arranged inside a sack arranged inside the container. The sack may prevent the elements from falling out of the container if the container is moving and/or if the container comprises an opening larger than the size of elements. The elements may also be removed from the container by lifting the sack, even if it is not possible to turn the container upside down. This facilitates cleaning the elements. Alternatively, the elements may also be sucked out of the container by use of vacuum.

According to one embodiment the elements have an outer surface, which is substantially symmetrical around at least one axis. Hence the elements are arranged in a regular pattern inside the container when they lie on each other, wherein they may more easily be distributed throughout the tank. Alternatively, if the element is designed to fill the entire volume of the container by itself, it is easier to adapt the shape of the element to the shape of the container if the element is substantially symmetrical.

According to one embodiment the element has an outer surface having a rounded shape. Preferably the outside is also smooth. Hence the probability that an element may slide past or slide on top of another element is increased, which facilitates placement of several elements inside a container. Preferably the outer surface is substantially spherical. Hence the elements may be packed very close to each other inside the container and the elements may easily roll onto each other and pass each other so that the elements are easy to distribute inside the container.

According to one embodiment the element comprises an inner space designed for receiving the fuel. Thus the fuel may be stored inside the elements as well as outside the elements, wherein the storage capacity of the container does not decrease in an as high degree when placing elements inside the container.

According to one embodiment the outer surface is provided with at least two openings into the inner space. Advantageously the two openings are located on opposite sides of the element. Hence it is ensured that there is at least one opening which is at least partly facing a first direction, for example upwards, and one opening which is at least partly facing a second, opposite direction, for example downwards, wherein the element allows a stream of fuel through the element. Preferably the outer surface is provided with several such openings. Preferably said openings are evenly distributed across the outer surface. Hence, the fall in pressure when the fuel flows through the element is decreased. Furthermore the probability that one opening is turned to face the direction of the fluid flow increases which also allows an increased fluid flow and decreased fall of the pressure.

According to one embodiment the element is manufactured from a metal. A metal has good heat conduction ability and is not sensitive to flames, which improves the performance of the element as an explosion suppressor. If the container in which the element is to be placed is of a metal it is advantageous if the element is manufactured in the same metal in order to decrease corrosion. Alternatively the element is manufactured in an aluminum- or iron alloy. With advantage the element is manufactured from thin metal plates having a high relationship between surface and volume. Preferably the metal plates are perforated to form said openings. According to another advantageous embodiment the element is manufactured from a net of metal. Preferably the element is also adapted for a fuel, which is a fluid, most preferably a liquid. Preferably the element is adapted to be used in a fuel tank for liquid fuel, most preferably a fuel tank adapted for use in a vehicle, preferably a ground based vehicle.

The element suppresses the risk of explosion in such a way that the element in an initial face absorbs heat energy, which lowers the temperature and thus the reaction rate of the explosion. Furthermore, the element also removes heat from the reaction site through heat conduction, which further decreases the reaction rate. Furthermore, the element suppress fluid movements of the fuel and of the air inside the container, which decreases both the flow of reactants towards the reaction site and decreases the increase in pressure obtained from the combustion gases acting on the walls of the container.

According to one embodiment the outer wall portion of the element comprises at least a first and a second shell. Hence, it is easier to establish an inner wall inside a hollow space formed by the shells, since the inner wall may be established before the shells are joined with each other.

According to one embodiment the first and the second shells comprises a first and a second engagement portion, respectively, wherein the engagement portions are shaped to join the shells by mechanically engaging each other. Hence it is not necessary to perform any heat treatment, like soldering, in order to join the shells, nor are any additional attachment members like rivets etc. needed.

According to one embodiment the first and the second shells are substantially hemi-spherical, and are adapted to form a substantially spherical outer wall portion. Hence the shells form a spherical outer wall surface in a simple and efficient manner.

SHORT DESCRIPTION OF THE DRAWINGS

FIG. 1a shows a use of several elements according to one example of the invention.

Figure 1B:
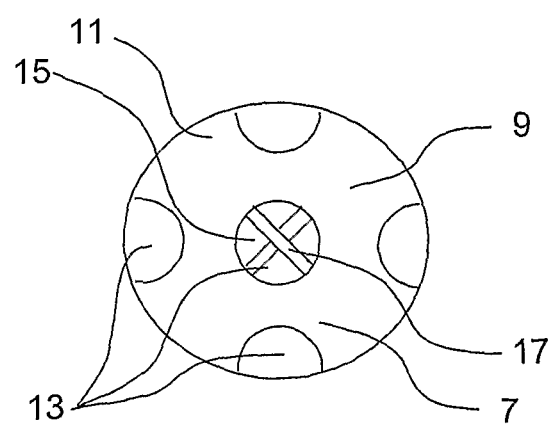
Figure 1C:
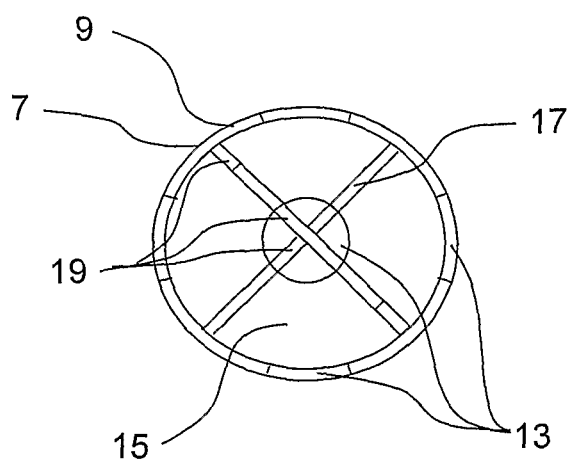
Figure 1D:
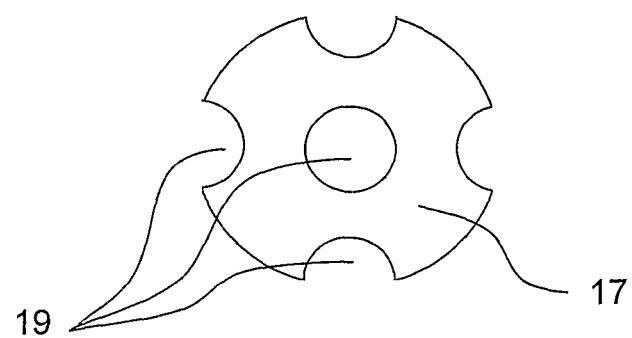

FIGS. 1b-d show the design of one example of an element in FIG. 1a in closer detail.

Figure 2A:
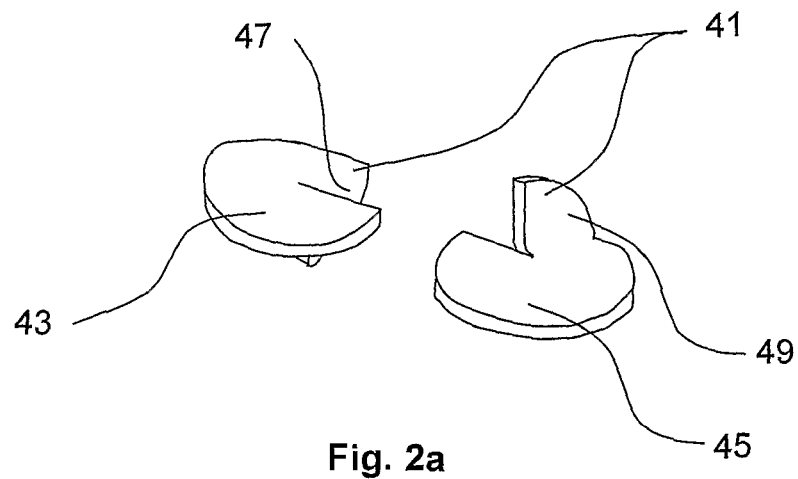
Figure 2B:
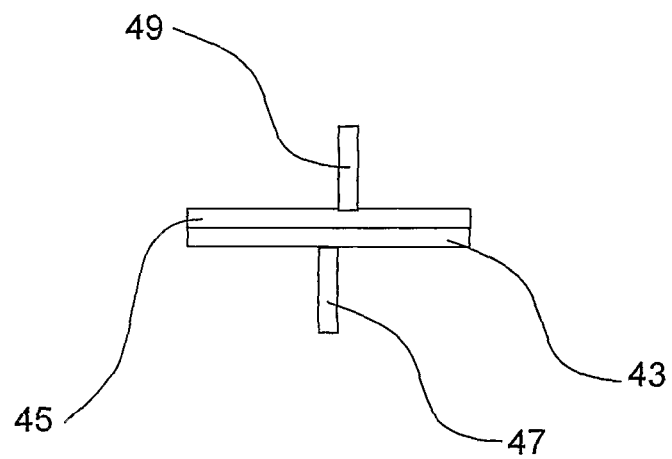

FIGS. 2a-b show one example of how to join two half spheres into one element of the invention.

Figure 3A:
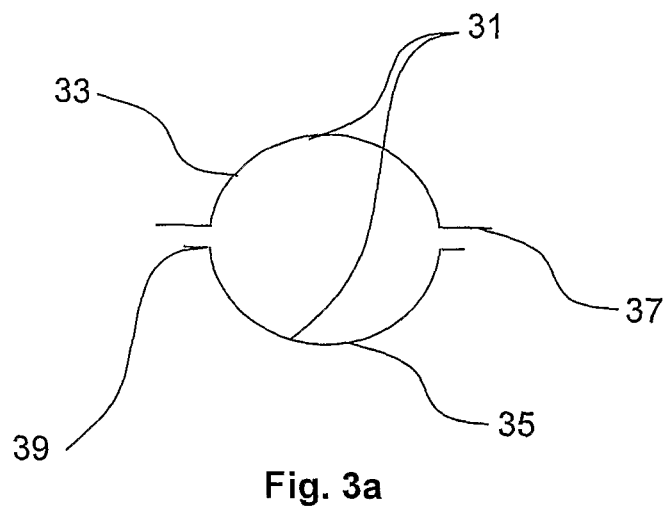
Figure 3B:
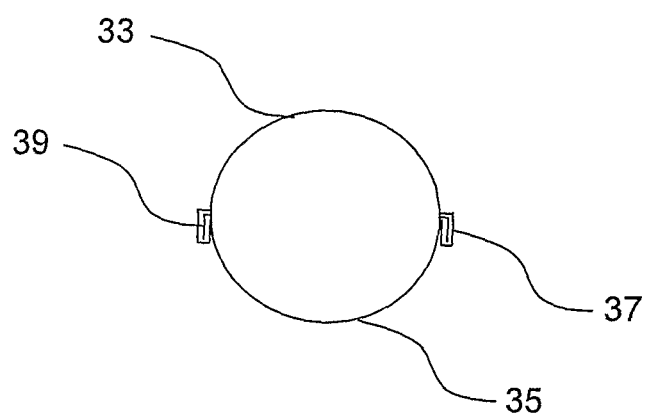

FIGS. 3a-b show one example of the manufacturing of outer walls.

DETAILED DESCRIPTION

In FIG. 1a a container 1 is shown designed for storage of fuel. In this case the container 1 is a fuel tank adapted for use in a vehicle. The container 1 comprises an inlet opening 3 to allow reception of fuel, and an outlet opening 5 to allow withdrawal of fuel for example to an engine. In FIG. 1a several elements 7 according to the invention are shown, which elements are intended to suppress the risk of explosion during handling of the fuel inside the container 1. The elements 7 are adapted to be placed inside the container 1 and are adapted to suppress a possible combustion of the fuel inside the container. The elements 7 are designed so that a connected hollow space 8 is formed between the elements 7. The connected hollow space 8 between the elements thus receives part of the fuel with which the container 1 is filled.

An element 7 comprises at least one outer wall portion 9 arranged to be in contact with the fuel in the container 1. The wall portion 9 is made in a heat conducting material in order to conduct heat from the fuel in the event of a combustion reaction inside the container. This decreases the risk of an explosion. The wall portion 9 also decreases fluid movements of the fuel and air inside the container 1, which further decreases the risk of explosion. According to the invention the element 7 is made in a stiff material and has such a shape that the element is shape permanent. Thus there is no risk that the elements 7 will collapse into themselves after some time of use, which increases safety. Furthermore, it is easier to fill the container 1 with the elements 7, since the shape of the elements does not change during the process of placement.

The elements 7 have a size adapted for placement of a element 7 in the container 1 together with a number of other similar elements 7. In this example the elements 7 are adapted to the dimensions of the container 1, so that the elements 7 together substantially fill the entire container 1. Thus, there are no large gaps inside the container in which an explosion may proceed unsuppressed. Furthermore, the element 7 is adapted to the container 1 in such a way that the size of the element 7 is smaller than the opening to the container 1, in this case smaller than the inlet opening 3. Hence the elements 7 may be placed inside the container 1 after that the container has been manufactured and sealed.

In FIGS. 1b-d the embodiment of a element 7 is shown in closer detail. In FIG. 1b an element is shown from the outside, in FIG. 1c a element is shown in cross section and in FIG. 1d an inner wall of the element 7 is shown. The element 7 is designed with an outer surface, which is adapted to supportably bear against the outer surfaces of the other similar elements 7. Thus the elements may be arranged on top of each other so that the elements fill the entire container 1. In this example the outer surface is substantially symmetrical around at least one axis through the element. The outer surface is thus shaped so that the elements become arranged in a regular pattern inside the container 1.

In FIG. 1c two inner walls 17 extending through an inner space 15 of the element 7 is shown. The inner walls 17 divide the volume inside the inner space 15, so that the distance to a wall portion 9 from an arbitrary point inside the element 7 is decreased. The inner walls 17 also support the outer wall 9 and thus contribute to the shape permanency and stability of the element 7. The inner wall 17 bear against the inside of the outer wall 9 so that, if a pressure or force is applied from the outside onto the outer wall 9, the pressure or force is transferred to the inner wall 17 which supports the force or pressure. The force or pressure will then act as a compressible force onto the inner wall 17. Since materials have a better resistance against a compressible force than towards for example a bending or tensional force, the thickness of the inner wall may be decreased. Furthermore, the thickness of the outer wall portion 9 may also be decreased since it is supported by the inner wall. Hence the capacity of the container to store fuel is increased without reducing the ability of the elements 7 to remain shape permanent and to suppress a possible explosion. Furthermore, by the use of inner walls 17, the element 7 may be designed with larger dimensions and with preserved explosion suppression.

In this example the element has an outer surface with a rounded shape, so that the element is rollable. Hence the element may easily be moved inside the container, which facilitates the distribution of the elements 7 evenly through out the volume of the container 1. When all elements 7 have been placed inside the container 1, the elements 7 are held in place from the fact that they bear against each other and against the walls of the container 1.

In this example the outer surface of the element is rounded in that the outer surface is substantially spherical. Hence the movement of the elements 7 is facilitated even further, since the friction when rolling the elements 7 is decreased. When several such elements 7 are arranged in a first layer inside the container 1 recessions are formed between the spherical elements 7, in which recessions the elements of the second layer arranged in the container may be positioned. Hence it is ensured that the elements are packed closely inside the container 1 and that the elements remain in place.

In this example the first bottom layer comprises five elements due to the bent corners of the container, and the second layer lying on top of the first comprises six elements. The six elements 7 are thus arranged in the recessions between the elements 7 of the first layer and between the outmost elements in the first layer and the walls of the container. Of course it may also be that the larger number of elements is in the first layer, just as well as there may be an even number of elements in both layers. The elements are even arranged in a third and a fourth layer as well, with five and six elements respectively, so that the elements substantially fill the entire volume of the container, all the way up to the ceiling of the container. In practice the number of elements in the layers will of course vary and also the number of layers, depending on the size of the elements in relation to the size of the container.

In FIG. 1b it is also shown that the outer surface of the elements 7 is provided with at least two openings 13. In this example the element 7 is provided with six openings 13 evenly distributed over the entire outer surface 11, of which five are visible in the figure. In FIG. 1c, showing the element in cross section, it is also shown that the element comprises said hollow space 15. The inner hollow space 15 is shaped for reception of fuel inside the element. The openings 13 are thus arranged to allow passage of the fuel into and out from the inner hollow space 15. By the openings 13 being distributed evenly over the outer surface of the element, it is ensured that the fuel may pass through the element 7 regardless of its orientation.

In FIG. 1d it is shown that the inner walls 17 are substantially circular and comprises several openings 19 to allow passage of fuel past the inner walls 17. In this example the inner walls 17 each comprises at least five openings, one located in the center of the inner wall, and four openings located along the periphery of the inner walls. Hence it is ensured that the fuel may pass through the element regardless of the orientation of the element inside the container. In practice any number of openings may of course be formed in the inner and outer walls.

A container may be filled with the elements by simply pouring the elements into the container. A stick may be used to move the elements inside the container. Alternatively air may be used to blow or suck the elements into place. The elements may also be packed inside a tube wherein, when placing the elements inside the fuel container, one end of the tube is inserted into the container, which is then opened so that the elements may roll down into the container. Alternatively the elements may be placed inside the container during manufacturing of the container.

In FIGS. 2a-b one example of the manufacturing of inner walls 41 for one example of an element according to the invention is shown. The inner walls 41 comprise a first circular plate 43 and a second circular plate 45. In a first step the plates are cut along a line extending from the middle of the plates 43, 45 to the rim of the plates. In a second step, one quadrant portion 47, 49 of each of the plates 43, 45, is folded so that the quadrant 47, 49 becomes perpendicular to the main body of the respective plates 43, 45. The first portion 47 of the first plate 43 is folded downwards while the second portion 49 of the second plate 45 is folded upwards.

In a third step the first 43 and the second plates 45 are put together so that the folded portions 47, 49 are directed in opposite directions. This is shown in FIG. 2b. Hence the non-folded portions of the plates 43, 45 constitute the horizontal part of the inner walls, while the folded portions 47, 49 constitute the vertical part of the inner walls 41.

In a fourth step the inner walls 41 made from the plates 43, 45 may then be positioned inside an inner space of an element. The separate plates 43, 45 are then held together by the outer walls of the element. The plates 43, 45 forming the inner walls 41, will thus bear against the inner surface of the outer walls of the element, and will thus be locked from movement by the outer walls. In this example the non-folded parts of the plates 43, 45 lock the inner walls 41 against movement in a horizontal direction, the folded portion 47 of the first plate 43 locks the inner walls against movement in a downward direction, and the folded portion 49 locks the inner walls against movement in an upward direction. Furthermore the plates 43 and 45 bear against each other so that the second plate 45 locks the first plate 43 from movement in an upward direction and vice versa. Hence the two separate plates are held together without the need for any additional joining, for example soldering.

In this example the plates 43, 45 are each formed by two layers of metal, which are joined with each other to form the respective plates 43, 45. In that the plates 43, 45 comprise two metal layers the stiffness of the plates 43, 45 is enhanced.

The inner walls may of course be manufactured in many other ways than shown here, and may also be shaped into many other forms. The inner walls may for example be pleated, creased, flat or folded, and may have different degrees of perforations or number of openings, both in the center of the plates and along the edges, that is, along the portions bearing against the inner surface of the outer walls. The inner walls may also be shaped to form a tube, giving a channel through which the fuel may flow.

The inner space of an element according to the invention may also be filled by filling materials, such as threads, metal wool, or thin bands of metal, which may be folded, turned or bundled together. This may be advantageous for a large element.

In FIGS. 3a-b one example of the manufacturing of outer walls 31 for one example of an element is shown. The outer wall 31 comprises a first shell 33, and a second shell 35. The shells 33, 35 are in this example dome shaped and each shell is formed as a hemi-sphere. The shells 33, 35 are in this example manufactured from metal plates, which are stamped in order to obtain openings in the plates. In another example the shells 33, 35 may instead be manufactured from metal nets. In this example the shells 33, 35 are also pressed in order to obtain the rounded shape of the shells.

In FIG. 3a the shells 33, 35 are shown before the shells are joined to form the element 31. The first shell 33 comprises a first engagement portion in the form of a flange 37 extending along the rim of the shell 33. The second shell 35 comprises a similar second engagement portion in the form of a flange 39 extending along the rim of the second shell 35 but only with half of the length of the first flange 37. When joining the first and the second shells 33, 35 the longer flange 37 is first folded over the second flange 39. In a second step the first flange 37 and the second flange 39 are once again folded so that they lie tightly against the surface of the first 33 and second shells 35. The engagement portions (37, 39) are thus shaped to join the shells (33, 35) by mechanically engaging each other. The first 33 and the second shells 35 are hence joined with each other by the mechanical folding. Hence there is no need for hot treatment, such as soldering or the like, in order to join the two shells. The joined shells 33, 35 are shown in FIG. 3b.

The outer wall of an element according to the invention may of course be manufactured in many other ways than shown here, and may also be formed with many different shapes. For example, two half spherical shells may be threaded along their rims, wherein the shells may be screwed together. In another example two spherical shells may be fitted one inside the other, to form one complete sphere, wherein the shells are held together mechanically.

The elements according to the invention are not limited to only one spherical outer wall but may comprise inner walls which are also spherical and arranged inside the hollow space formed by the outer walls. An element may also be filled with a supportive inner material during the manufacturing of the element, which may be burnt off after the forming of the outer walls.

The embodiments of the invention described herein are only to be considered as non-limited examples of the invention, which may be varied within the framework of the attached claims.

For example the element does not need to be spherical but the shape of the element may be cylindrical, cubical, oval, rectangular, pyramidal or have any other suitable shape. The elements are preferably manufactured in a metal, but they may also comprise any other materials, such as a polymer material or ceramic. Furthermore, an element may comprise several different materials in combination. The expression 'metal' is intended to include all forms of metal, both pure metals and metal alloys.

The invention claimed is:

1. A spherical, pyramidal or oval element (7) intended to decrease the risk for explosion when handling fuel in a container (1), the spherical, pyramidal or oval element (7) being configured to be positioned inside the container (1) to suppress a possible combustion of the fuel inside the container, wherein
the spherical, pyramidal or oval element (7) comprises at least one outer wall portion (9, 31) arranged to be in contact with the fuel and suppress a possible combustion of the fuel inside the container (1),
the outer wall portion (9, 31) encloses an inner space (15) shaped for receiving fuel, and
the spherical, pyramidal or oval element (7) comprises two inner wall portions (17) each being substantially circular, having a central opening (19) therethrough and a plurality of concavities (19) along an outer circumference thereof, inside and extending across the inner space (15) to contact an inner surface of and support the outer wall portion (9, 31) of the spherical, pyramidal or oval element (7) with an end part of the inner wall portion (17), such that the spherical, pyramidal or oval element (7) is shape permanent.

2. An element according to claim 1, wherein said inner wall portions (17) are arranged to absorb forces acting on the outer wall portion (9, 31) as compressive forces.

3. An element according to claim 1, wherein the inner wall portions (17) extend across the inner space (15), so that the inner wall portions (17) support the outer wall (9, 31) in at least four locations, with one end of each said inner wall portion (17, 41) at each location.

4. An element according to claim 3, wherein the inner wall portions (17, 41) extend substantially straight through the inner space (15), such that two support locations of the outer wall (9) are positioned substantially opposite to each other.

5. An element according to claim 1, wherein the element (7) is adapted to be positioned inside the container together with several similar elements (7).

6. An element according to claim 5, wherein the outer wall (9) is shaped with an outer surface (11) adapted to supportively bear against the outer surfaces (11) of the other similar elements (7).

7. An element according to claim 1, wherein the element (7) has an outer surface (11), which is substantially symmetrical around at least one axis through the element (7).

8. An element according to claim 1, wherein the element has an outer surface (11) provided with at least two openings (13) into the inner space (15).

9. An element according to claim 8, wherein the outer surface (11) is provided with several openings (13).

10. An element according to claim 9, wherein the openings (13) are evenly distributed on the outer surface (11).

11. An element according to claim 1, wherein the element (7) is made of substantially stiff material.

12. An element according to claim 1, wherein the element (7) is manufactured from a metal or metal alloy.

13. An element according to claim 1, wherein the outer wall portion (9, 31) of the element (7) comprises at least a first (33) and a second shell (35).

14. An element according to claim 13, wherein the first (33) and the second shells (35) comprises a first (37) and a second engagement portion (39), respectively, and the engagement portions (37, 39) are shaped to join the shells (33, 35) by mechanically engaging each other.

15. An element according to claim 13, wherein the element (7) is spherical and the first (33) and second shells (35) are substantially hemi-spherical, and arranged to form a substantially spherical outer wall portion (9, 31).

16. An element (7) intended to decrease the risk for explosion when handling fuel in a container (1),
the element (7) being configured to be positioned inside the container (1) to suppress a possible combustion of the fuel inside the container, wherein
the element (7) is spherical and comprises at least one outer wall portion (9, 31) arranged to be in contact with the fuel and suppress a possible combustion of the fuel inside the container (1),
the outer wall portion (9, 31) encloses an inner space (15) configured for receiving fuel,
the element (7) comprises at least one inner wall portion (41) arranged inside the inner space (15) to support the outer wall portion (9, 31) with an end part of the inner wall portion (41), such that the element (7) is shape permanent, and
the inner wall portion (41) comprises first and second circular plates (41, 43) situated flat against one another and each being cut along a line extending from a middle to a rim thereof to define quadrant portions (47, 49),
with the quadrant portion (47) of the first circular plate (41) being folded in one direction and the quadrant portion (49) of the second circular plate (43) being folded in an opposite direction.

17. An element (7) according to claim 16, wherein the quadrant portions (47, 49) are both axially and radially offset from one another in folded condition and extending away from the circular plates (41, 43).

18. A spherical, pyramidal or oval element (7) intended to decrease the risk for explosion when handling fuel in a container (1),
the element (7) being configured to be positioned inside the container (1) and suppress possible combustion of the fuel inside the container (1), wherein
the element (7) comprises
(i) at least one outer wall portion (9, 31) arranged to be in contact with the fuel and suppress possible combustion of the fuel inside the container (1), the outer wall portion (9, 31) enclosing an inner space (15) shaped for receiving fuel, and
(ii) at least one inner wall portion (17, 41) arranged inside the inner space (15) and to support the outer wall portion (9, 31) of the element (7) with an end part of the inner wall portion (17, 41), such that the element (7) is shape permanent,
the inner wall portion (41) comprises
(a) a first portion (43, 45) arranged to support the outer wall portion (9) with one end of the first portion (43, 45), and (b) a second portion (47, 49) arranged at an angle to the first portion (43, 45), and to support the outer wall portion (9) with one end of the second wall portion (47, 49), and the inner wall portion (41) comprise a first circular plate (43) and a second circular plate (45), with a portion (47) of the first plate (43) folded downwardly and a portion (49) of the second plate (45) folded upwardly.

19. An element (7) according to claim 18, wherein the element (7) is manufactured from metal.

\* \* \* \* \*